United States Patent [19]

Rogers

[11] 4,030,805

[45] June 21, 1977

[54] INFRA-RED LENSES

[75] Inventor: Philip John Rogers, Meliden, Wales

[73] Assignee: Pilkington P-E Limited, St. Helens, England

[22] Filed: Feb. 10, 1975

[21] Appl. No.: 548,587

[30] Foreign Application Priority Data

Feb. 15, 1974 United Kingdom .............. 7105/74

[52] U.S. Cl. .................................. 350/2; 350/220
[51] Int. Cl.[2] ...................... G02B 1/00; G02B 9/34
[58] Field of Search ................................ 350/2, 220

[56] References Cited

UNITED STATES PATENTS

| | | | |
|---|---|---|---|
| 1,967,836 | 7/1934 | Merte ................................ | 350/220 |
| 2,684,015 | 7/1954 | Grey ...................................... | 350/2 |
| 3,321,264 | 5/1967 | Sijgers et al. ........................... | 350/2 |
| 3,363,962 | 1/1968 | Vogl ...................................... | 350/2 |

*Primary Examiner*—John K. Corbin
*Assistant Examiner*—Conrad Clark

*Attorney, Agent, or Firm*—Mattern, Ware, Davis and Stoltz

[57] ABSTRACT

An infra red lens of very high aperture greater than F/0.75 specially adapted to transmit a waveband in the infra red range comprises from front to back in the order given (a) at least one positive meniscus element convex towards the front, (b) a negative meniscus element concave towards the front, (c) a positive meniscus element convex towards the front and (d) a positive element having a front surface convex towards the front. In a preferred embodiment there is a single positive meniscus element (a) convex towards the front in front of the negative meniscus element (b) and in another embodiment there are two positive meniscus elements (a) convex towards the front in front of the negative meniscus element (b). The back element (d) which has a front surface convex towards the front may be a meniscus element or may be convex-plano or biconvex.

24 Claims, 2 Drawing Figures

INFRA-RED LENSES

This invention concerns improvements in or relating to infra-red lenses, i.e. lenses designed to transmit in a waveband in the infra-red region.

According to the invention there is provided an infra-red lens comprising from front to back in the order given at least one positive meniscus element convex towards the front, a negative meniscus element concave towards the front, a positive meniscus element convex towards the front, and a positive element having a front surface convex towards the front.

In one embodiment of lens in accordance with the invention there is a single positive meniscus element convex towards the front in front of the negative meniscus element, while in another embodiment there are two positive meniscus elements convex towards the front in front of the negative meniscus element.

The back element having a front surface convex towards the front may be a meniscus element, or may in some circumstances be convex-plano or biconvex.

The front positive meniscus element or elements may be of germanium or may be of silicon. The negative meniscus element may be of germanium or of a material having a higher dispersion than germanium and which is transmissive in the wavelength band in which the lens is designed to operate. The positive meniscus element behind the negative meniscus element may be of germanium or of silicon. The back positive element convex towards the front may be of germanium or of another material which transmits in the wavelength band in which the lens is designed to operate.

In a four element lens in accordance with the invention (i.e. having a single positive meniscus element in front of the negative meniscus element) the individual elements may, by way of example, have focal lengths (from front to back) in the respective ranges +1.5F to +1.8F, −1.3F to −3.2F, +0.7F to +2.9F and +0.6F to +0.7F (where F is the focal length of the complete lens). The spaces between the elements may, by way of example, be (from front to back) in the respective ranges 0.6F to 0.9F, 0.3F to 0.4F, and about 0.1F.

In a five element lens in accordance with the invention (i.e. having two positive meniscus elements in front of the negative meniscus element) the frontmost positive meniscus element may be of relatively weak power and may, for example, have a focal length of about +7F.

A lens in accordance with the invention may be of high aperture, e.g. up to a Numerical Aperture of about 0.9 (F/0.55), and may have a field of view up to of the order of 20° (or up to about 30° if degradation of the image is acceptable).

Embodiments of lenses in accordance with the invention will now be described, by way of example, with reference to the accompanying drawing, in which.

Figure 1:
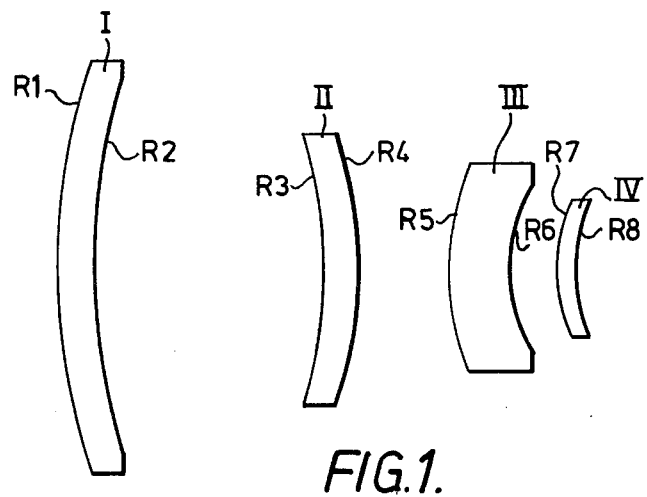
FIG. 1 is a schematic representation of one embodiment of an infra-red lens.

The lens shown in FIG. 1 is a four element lens comprising from front to back a first element 1 which is a positive meniscus convex towards the front, a second element 11 which is a negative meniscus concave towards the front, a third element III which is a positive meniscus convex towards the front, and a fourth element IV which is a positive meniscus convex towards the front.

In a preferred example designed to operate in the wavelength band of 8 to 14 microns all four elements are of germanium. However, if desired the first and third elements I and III may be of germanium, the second element II may be of a material having a dispersion higher than that of germanium and which is transmissive in the wavelength band in which the lens operates (8 to 14 microns), and the fourth element IV may be of a material which is transmissive in the operational wavelength band (the dispersion of the fourth element IV not being critical).

In another example adapted to operate in the wavelength band of 3 to 5.5 microns the first element I is of silicon, the second element II is of germanium or of another material of higher dispersion than silicon, the third element II is of germanium or of silicon, and the fourth element IV is of a material which is transmissive in the operational wavelength band.

Where the fourth element IV is of a material having a refractive index considerably lower than that of germanium, the element may, instead of being meniscus as described above, be convex-plano or even (with very low refractive index material) bi-convex.

Particular examples of lenses in accordance with the embodiment of FIG. 1 are as given below (the surfaces from front to back being indicated as R1 to R8.)

In each example the element indicated as W is a window having planar front and rear surfaces W1 and W2 associated with the lens. While the precise value of the window thickness influences the curvatures and axial distances of the lens, the basic construction of the lens is applicable to cases without a window and to other window thicknesses.

The units of radius of curvature of the surfaces of the elements and the axial thicknesses of and spacings between the elements are millimetres and in each example the complete lens has a focal length F of 100 millimetres. As will be understood by those skilled in the art, however, the values are relative and can be scaled accordingly.

Examples 1 to 4 are designed to operate in the 8 to 14 micron spectral bandwidth while Examples 5 and 6 are designed to operate in the 3 to 5.5 micron spectral bandwidth.

Example 1

| Element | Surface | Radius of Curvature | Axial Separation/Thickness | Material |
|---|---|---|---|---|
| I | R1 | +137.43 | | Germanium |
| | R2 | +184.80 | 13.717 | |
| | | | 86.746 | |
| II | R3 | −198.14 | | Germanium |
| | R4 | −403.40 | 7,482 | |
| | | | 26.987 | |
| III | R5 | +60.825 | | Germanium |
| | R6 | +59.222 | 24.441 | |
| | | | 6.844 | |
| IV | R7 | +58.297 | | Germanium |
| | R8 | +83.703 | 3.741 | |
| | | | 5.097 | |
| W | W1 | infinity | | Germanium |
| | W2 | infinity | 1.473 | |

The stop position of the lens is located at the front surface R1. The lens has an aperture of F/0.59 and a field of view of 16.5°. The individual elements have focal lengths as follows: I + 1.47F, II −1.34F, III +0.72F, IV +0.58F. The elements are all of germanium (refractive index 4.0028 at 10.6 microns wavelength and constringence V of 1004 at 8.5 to 12.5 microns wavelength).

Example 2

| Element | Surface | Radius of Curvature | Axial Separation/Thickness | Material |
|---|---|---|---|---|
| I | R1 | +136.68 | | |
| | | | 13.769 | Germanium |
| | R2 | +181.91 | | |
| | | | 83.008 | |
| II | R3 | −205.82 | | |
| | | | 7.511 | Germanium |
| | R4 | −366.73 | | |
| | | | 26.374 | |
| III | R5 | +63.791 | | |
| | | | 22.532 | Germanium |
| | R6 | +58.087 | | |
| | | | 6.844 | |
| IV | R7 | +62.493 | | |
| | | | 5.860 | Germanium |
| | R8 | +88.197 | | |
| | | | 8.151 | |
| W | W1 | infinity | | |
| | | | 1.478 | Germanium |
| | W2 | infinity | | |

The stop position of the lens is located 45.65 mm behind the second surface R2. The lens has an aperture of F/0.58 and a field of view of 20°. The individual elements have focal lengths as follows: I + 1.49F, II −1.62F, III +1.09F, IV +0.61F. The elements are all of germanium (refractive index 4.0028 at 10.6 microns wavelength and constringence V of 1004 at 8.5 to 12.5 microns wavelength).

Example 3

| Element | Surface | Radius of Curvature | Axial Separation/Thickness | Material |
|---|---|---|---|---|
| I | R1 | +136.368 | | |
| | | | 13.715 | Germanium |
| | R2 | +181.438 | | |
| | | | 83.107 | |
| II | R3 | −201.977 | | |
| | | | 7.481 | Germanium |
| | R4 | −366.057 | | |
| | | | 26.423 | |
| III | R5 | +63.474 | | |
| | | | 22.560 | Germanium |
| | R6 | +58.048 | | |
| | | | 6.840 | |
| IV | R7 | +62.196 | | |
| | | | 5.837 | Germanium |
| | R8 | +87.739 | | |
| | | | 6.798 | |
| W | W1 | infinity | | |
| | | | 1.473 | Germanium |
| | W2 | infinity | | |
| | | | 1.510 | |

The stop position of the lens is located 45.72 mm behind the second surface R2. The lens has an aperture of F/0.55 and a field of view of 20°. The individual elements have focal lengths as follows: I +1.49F, II −1.55F, III +1.07F, IV +0.61F. The elements are all of germanium (refractive index 4.0028 at 10.6 microns wavelength and constringence V of 1004 at 8.5 to 12.5 microns wavelength). The lens is specifically designed to operate in the 8 to 13 micron spectral bandwidth.

Example 4

| Element | Surface | Radius of Curvature | Axial Separation/Thickness | Material |
|---|---|---|---|---|
| I | R1 | +149.985 | | |
| | | | 13.983 | Germanium |
| | R2 | +193.616 | | |
| | | | 70.756 | |

Example 4-continued

| Element | Surface | Radius of Curvature | Axial Separation/Thickness | Material |
|---|---|---|---|---|
| II | R3 | −220.900 | | |
| | | | 6.745 | Harshaw Chemicals KRS-5 |
| | R4 | −459.777 | | |
| | | | 33.517 | |
| III | R5 | +77.141 | | |
| | | | 26.302 | Germanium |
| | R6 | +65.827 | | |
| | | | 12.669 | |
| IV | R7 | +65.393 | | |
| | | | 6.988 | Germanium |
| | R8 | +89.722 | | |
| | | | 14.312 | |
| W | W1 | infinity | | |
| | | | 1.492 | Germanium |
| | W2 | infinity | | |
| | | | 1.075 | |

The stop position of the lens is located 38.9 mm behind the second surface R2. The lens has an aperture of F/0.58 and a field of view of 12°. The individual elements have focal lengths as follows: I +1.79F, II −3.16F, III +2.25F, IV +0.66F. Elements I, III and IV and the window W are of germanium (refractive index 4.0028 at 10.6 microns wavelength and constringence V of 1004 at 8.5 to 12.5 microns wavelength). The second element II is of a material having a higher dispersion than germanium, namely thalliumbromoiodide Th(BrI) which is obtainable under the trade name KRS-5 from The Harshaw Chemical Company, 6801 Cochran Road, Solon, Ohio 44139, U.S.A. This material has a refractive index of 2.3694 at 10.6 microns wavelength and a constringence V of 164 at 8.5 to 12.5 microns wavelength. The lens is specifically designed to operate in the 8 to 13 micron spectral bandwidth.

Example 5

| Element | Surface | Radius of Curvature | Axial Separation/Thickness | Material |
|---|---|---|---|---|
| I | R1 | +139.414 | | |
| | | | 17.370 | Silicon |
| | R2 | +202.075 | | |
| | | | 56.933 | |
| II | R3 | −422.319 | | |
| | | | 8.685 | Germanium |
| | R4 | −1124.037 | 38.215 | |
| III | R5 | +59.327 | | |
| | | | 14.474 | Silicon |
| | R6 | +53.627 | | |
| | | | 11.670 | |
| IV | R7 | +62.021 | | |
| | | | 7.934 | Germanium |
| | R8 | +80.674 | | |
| | | | 15.634 | |
| W | W1 | infinity | | |
| | | | 1.867 | Sapphire |
| | W2 | infinity | | |
| | | | 2,920 | |

The axial entrance pupil position is located 70.0 mm behind the first surface R1. The lens has an aperture of F/0.64 and a field of view of 20°. The individual elements have focal lengths as follows: I +1.55F, II −2.26F, III +2.88F, IV +0.67F. Elements I and III are of silicon (refractive index 3.4261 at 3.8 microns wavelength and constringence V of 368 at 3.3 to 4.7 microns wavelength). Elements II and IV are of germanium (refractive index 4.0268 at 3.8 microns wavelength and constringence V of 164 at 3.3 to 4.7 microns wavelength). The window W is of sapphire (refractive index 1.6830 at 3.8 microns wavelength and constringence V of 11 at 3.3 to 4.7 microns wavelength). The lens is specifically designed to operate in the 3.2 to 4.8 micron spectral bandwidth.

Example 6

| Element | Surface | Radius of Curvature | Axial Separation/ Tickness | Material |
|---|---|---|---|---|
| I | R1 | +139.712 | | Silicon |
| | | | 17.401 | |
| | R2 | +202.380 | | |
| | | | 58.963 | |
| II | R3 | −418.469 | | Germanium |
| | | | 8.701 | |
| | R4 | −1186.210 | | |
| | | | 38.543 | |
| III | R5 | +59.675 | | Germanium |
| | | | 14.500 | |
| | R6 | +53.438 | | |
| | | | 11.691 | |
| IV | R7 | +62.461 | | Germanium |
| | | | 7.948 | |
| | R8 | +80.316 | | |
| | | | 15.663 | |
| W | W1 | infinity | | Sapphire |
| | | | 1.870 | |
| | W2 | infinity | | |
| | | | 1.680 | |

The axial entrance pupil position is located 70.1 mm behind the first surface R1. The lens has an aperture of F/0.64 and a field of view of 20°. The individual elements have focal lengths as follows: I +1.55F, II −2.15F, III +2.26F, IV +0.70F. Element I is of silicon (refractive index 3.4261 at 3.8 microns wavelength and constringence V of 368 at 3.3 to 4.7 microns wavelength). Elements II, III and IV are of germanium (refractive index 4.0268 at 3.8 microns wavelength and constringence V of 164 at 3.3 to 4.7 microns wavelength). The window W is of sapphire (refractive index 1.6830 at 3.8 microns wavelength and constringence V of 11 at 3.3 to 4.7 microns wavelength). The lens is specifically designed to operate in the 3.2 to 4.8 micron spectral bandwidth.

Figure 2:
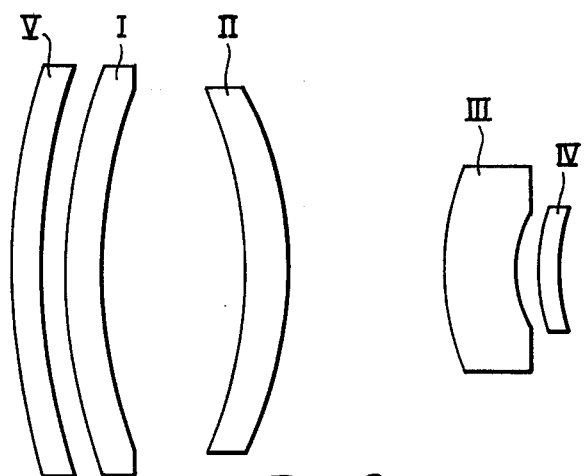
FIG. 2 is a schematic representation of another embodiment of infra-red lens.

The embodiment shown in FIG. 2 is generally similar to that shown in FIG. 1 but is a five element lens, the fifth or additional element relative to FIG. 1 being a positive meniscus element V convex towards the front and located at the front of the lens. This element V is relatively weak in power and, for example, has a focal length of +7.0F. The element V is preferably of germanium but may be of other material and in particular where the element I is of silicon the element V may also be of silicon.

It is well known to those conversant with the art that prior lenses designed to operate in the 3 to 5.5 and 8 to 14 micron spectral bandwidth and comprising three separated lens elements made of materials that transmit in the infra-red, for example germanium, silicon or some other materials, are capable of high apertures by virtue of the high refractive index of the materials employed. To the best of applicant's knowledge, however, up to the present time the highest aperture that has been satisfactorily attained by systems of this type is approximately F/0.75. As will be apparent from the foregoing the present invention effectively provides a simple, inexpensive modification that can be made to the triplet configuration in order to considerably increase its aperture without detriment to its field of view.

The aberration that limits the on-axis aperture of the known triplet construction is an excess of positive transverse fifth order spherical aberration arising at the third material/air surface. This excess of positive fifth order spherical aberration results from the large value of positive third order spherical aberration required from this surface in order to counteract the aggregate of the negative third order contributions from the other two elements.

Detailed aberration analysis shows that the third, fifth and seventh order spherical aberrations contributions of the third lens element all have a sign and that the ratios of the values of seventh order: third order and fifth order: third order are higher for this element than for the other two lens elements.

If the triplet construction is altered (as effectively proposed herein) such that the third lens element is changed into a pair of lens elements separated by a small air-gap, then the overall negative third order contribution of the lens pair can be made slightly less than that of the single element thus requiring less positive third order and less excess fifth order spherical aberration from the third material/air surface. At the same time shapes, thicknesses and positions with respect to each other and the focal plane can be chosen for the pair of elements such that the amounts of negative fifth and seventh order spherical aberration given by the pair of elements can be increased relative to their negative third order contribution. This results in the overall lens having a smaller excess of positive fifth order and a strong negative seventh order spherical aberration contribution. The combination of these with some residual negative third order spherical aberration enables a very high aperture of typically F/0.58 to be achieved.

Aberration correction off-axis to fields of view in excess of 20° is obtained in the same manner as in a normal triplet construction in that the separations between the first two single elements and the pair of elements that replaces the third element plus a choice of lens element shapes gives control over coma, astigmatism and distortion. Due to the high refractive index of the materials employed, the Petzval sum is low and therefore a flat field is obtained.

Due to its low dispersion in the 8 to 14 micron spectral bandwidth, germanium can be used for all the lens elements when the lens is to be used in this bandwidth. Alternatively a more dispersive material can be used as the second element (as illustrated by Example 4) in order to correct the small amount of residual chromatic aberration. As the refractive index of the second element in the lens pair (i.e. the fourth element of the lens) is not critical a range of materials may be used for this element with appropriate redesign.

In the 3 to 5.5 micron spectral bandwidth, silicon would appear to be the ideal choice for the first single element because of its low dispersion in this region of the spectrum. The third element (i.e. the first element in the lens pair) may also be of silicon (Example 5) or may be of germanium (Example 6). Germanium or some other material more dispersive than silicon can be used for the second single element in order to correct chromatic aberration. As before a range of materials may be used for the second element of the lens pair. The lowest achievable F. number in the 3 to 5.5 micron bandwidth may be higher than in the 8 to 14 micron bandwidth due to the lower refractive index of silicon.

I claim:

1. An infra-red lens of very high aperture greater than F/0.75 comprising from front to back in the order given at least one positive meniscus first element convex towards the front, a negative meniscus second element concave towards the front, a positive meniscus third element convex towards the front and a positive fourth element having a front surface convex towards the front, all of said elements being spaced apart.

2. A lens according to claim 1 having a single positive meniscus element convex towards the front in front of the negative meniscus element.

3. A lens according to claim 1 having two positive meniscus elements convex towards the front in front of the negative meniscus element.

4. A five element lens according to claim 3 wherein the front-most positive meniscus element has a focal length of about +7F (where F is the focal length of the complete lens).

5. A lens according to claim 1 wherein the back element having a front surface convex towards the front is a meniscus element.

6. A lens according to claim 1 wherein the back element having a front surface convex towards the front has a back surface curvature greater than or equal to zero and of the opposite sign as the curvature of said front surface.

7. A lens according to claim 1 wherein said at least one positive meniscus element is of a material selected from the group consisting of germanium and silicon.

8. A lens according to claim 1 wherein the negative meniscus element is of a material having a dispersion at least as high as germanium.

9. A lens according to claim 1 wherein the positive meniscus element behind the negative meniscus element is of a material selected from the group consisting of germanium and silicon.

10. A lens according to claim 1 wherein the back positive element having a front surface convex towards the front is of germanium.

11. A lens according to claim 1, wherein, the rear surface of said third element is of greater curvature than its front surface.

12. A lens according to claim 1, wherein, the radius of curvature of the rear surface of said third element is less than the focal length of the lens.

13. A lens according to claim 1, wherein, the rear surface of said third element is of greater curvature than its front surface, and the radius of curvature of the rear surface of said third element is less than the focal length of the infra-red lens.

14. A lens according to claim 13, wherein, the radius of curvature of the rear surface of said fourth element is less than the focal length of the infra-red lens.

15. A lens according to claim 1, wherein, the radius of curvature of the rear surface of said fourth element is less than the focal length of said infra-red lens.

16. A lens according to claim 1, wherein, the radius of curvature of the front surface of said fourth element is greater than the radius of curvature of the rear surface of said third element.

17. A four element lens according to claim 2 wherein all four elements are of germanium.

18. A four element lens according to claim 2 wherein (as considered from front to back) the first and third elements are of germanium and the second element is of a material having a dispersion higher than that of germanium.

19. A four element lens according to claim 2 wherein (as considered from front to back) the first element is of silicon, the second element is of a material of higher dispersion than silicon, and the third element is of a material selected from the group consisting of germanium and silicon.

20. A four element lens according to claim 2 wherein the individual elements (considered from front to back) have focal lengths in the respective ranges +1.5F to +1.8F, −1.3F to −3.2F, +0.7F to +2.9F, and +0.6F to +0.7F (where F is the focal length of the complete lens).

21. A four element lens according to claim 20 wherein the spaces between the individual elements (as considered from front to back) are in the respective ranges 0.6F to 0.9F, 0.3F to 0.4F and about 0.1F (where F is the focal length of the complete lens).

22. In an infra-red lens basically of triplet configuration having a front component comprising at least one positive meniscus element convex towards the front, a middle component comprising a negative meniscus element concave towards the front, and a positive rear component, the improvement wherein the positive rear component comprises a pair of spaced apart lens elements the front one of which is a positive meniscus element convex towards the front and the rear one of which is a positive element having a front surface convex towards the front, thereby increasing the aperture of the lens to greater than F/0.75.

23. In an infra-red lens basically of triplet configuration having a front component comprising at least one positive meniscus element convex towards the front, a middle component comprising a negative meniscus element concave towards the front whose front concave surface provides positive third order spherical aberration which counteracts the aggregate of the negative third order contributions from the other lens elements, the aperture of the lens being limited by the excess positive transverse fifth order spherical aberration which arises at said front concave surface as a result of said positive third order spherical aberration, and a positive rear component, the improvement wherein said positive rear component comprises a pair of separate lens elements the front one of which is a positive meniscus element convex towards the front and the rear one of which is a positive element having a front surface convex towards the front, thereby limiting the negative third order spherical aberration contribution of said rear component and hence the amount of positive third order spherical aberration required from said front concave surface, so that the resulting excess positive transverse fifth order spherical aberration arising at said front concave surface is of a limited value which allows a very high aperture greater than F/0.75 to be attained.

24. An infra-red lens of very high aperture comprising from front to back in the order given at least one positive meniscus element convex towards the front, a negative meniscus element concave towards the front and spaced from said at least one positive meniscus element, the front concave surface of said negative meniscus element providing positive third order spherical aberration which counteracts the aggregate of the negative third order contributions from the other lens elements and the resulting excess positive transverse fifth order spherical aberration arising at said front concave surface determining the aperture of the lens, and a pair of lens elements spaced from said negative meniscus element, the front element of said pair being a positive meniscus element convex towards the front and the rear element of said pair being a positive element having a front surface convex towards the front, the negative third order spherical aberration contribution of said lens pair being of a limited value at which the counteracting positive third order spherical aberration provided by said front concave surface results in a limited amount of excess positive transverse fifth order spherical aberration providing a very high aperture greater than F/0.75.

* * * * *

UNITED STATES PATENT AND TRADEMARK OFFICE
CERTIFICATE OF CORRECTION

PATENT NO. : 4,030,805

DATED : June 21, 1977

INVENTOR(S) : Philip John Rogers

It is certified that error appears in the above-identified patent and that said Letters Patent are hereby corrected as shown below:

Column 2, Example 1, under "Radius of Curvature" cancel "-198.14" and substitute therefor -- -198.41 --;

under "Axial Separation/Thickness" "7,482" should be brought into vertical alignment with other entries;

Column 4, Example 4, under "Radius of Curvature" cancel "+65.827" and substitute therefor -- +64.827--;

Column 4, Example 5, under "Axial Separation/Thickness" "2,920" should be brought into vertical alignment with other entries;

Column 6, line 8, after "a" insert --negative--.

Signed and Sealed this

Twenty-seventh Day of June 1978

[SEAL]

Attest:

RUTH C. MASON
*Attesting Officer*

DONALD W. BANNER
*Commissioner of Patents and Trademarks*